(12) United States Patent
Yamaguchi

(10) Patent No.: US 6,385,675 B1
(45) Date of Patent: *May 7, 2002

(54) PRINTING SYSTEM ADAPTED TO CHANGE A PRINTING OPERATION TO BE PERFORMED BASED ON A RESULT OF AN ACCOUNTING OPERATION

(75) Inventor: Fumiyoshi Yamaguchi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/889,180

(22) Filed: Jul. 7, 1997

(30) Foreign Application Priority Data

Jul. 5, 1996 (JP) ............................................. 8-176428

(51) Int. Cl.⁷ .......................... G06F 13/10; G03G 21/00
(52) U.S. Cl. ............................. 710/72; 710/8; 710/14; 710/62; 705/400; 399/79; 399/80
(58) Field of Search ......................... 235/381; 345/173; 358/402, 453, 85; 399/366, 79, 80; 705/400; 395/885; 710/8, 14, 62, 72

(56) References Cited

U.S. PATENT DOCUMENTS

| 4,733,274 A | * | 3/1988 | Tachika et al. ................ 399/85 |
| 4,839,829 A | * | 6/1989 | Freedman .................... 345/329 |
| 4,928,244 A | * | 5/1990 | Vermesse ..................... 705/411 |
| 5,038,293 A | * | 8/1991 | Goodman ............... 364/479.03 |
| 5,130,757 A | * | 7/1992 | Ito ............................. 358/402 |
| 5,146,344 A | * | 9/1992 | Bennett et al. .............. 358/296 |
| 5,339,168 A | * | 8/1994 | Evanitsky et al. ........... 358/402 |
| 5,383,129 A | * | 1/1995 | Farrell ......................... 705/400 |
| 5,604,578 A | * | 2/1997 | Shibuya et al. .............. 399/178 |
| 5,608,544 A | * | 3/1997 | Yamanishi ................... 358/453 |
| 5,610,688 A | * | 3/1997 | Inamoto et al. ............. 399/366 |
| 5,619,024 A | * | 4/1997 | Kolls ........................... 235/381 |
| 5,742,279 A | * | 4/1998 | Yamamoto et al. .......... 345/173 |
| 5,761,651 A | * | 6/1998 | Hasebe et al. ............... 705/400 |
| 5,825,988 A | * | 10/1998 | Collard et al. .............. 395/112 |
| 5,835,689 A | * | 11/1998 | Braun et al. ................. 395/113 |
| 6,151,590 A | * | 11/2000 | Cordery et al. ................ 705/60 |

FOREIGN PATENT DOCUMENTS

JP          406115274 A  *  4/1994  ............. B42B/4/00

* cited by examiner

Primary Examiner—Thomas Lee
Assistant Examiner—Ilwoo Park
(74) Attorney, Agent, or Firm—Fitzpatrick, Cella, Harper & Scinto

(57) ABSTRACT

There is disclosed a printer or copying machine which operates according to several different functional and operational modes, a host computer which sends a print or copy order to the printer or copying machine, which order may include the number of copies to be made, the time of printing or copying, and an operational mode, such as size of copy, two-sided copying, collating, stapling, etc., and an accounting means which calculates charges based on the order before it is carried out by the printer or copying machine and which transmits those charge to the host computer.

26 Claims, 6 Drawing Sheets

(ACCOUNTING FOR PRE-VIEW)

US 6,385,675 B1

PRINTING SYSTEM ADAPTED TO CHANGE A PRINTING OPERATION TO BE PERFORMED BASED ON A RESULT OF AN ACCOUNTING OPERATION

BACKGROUND OF THE INVENTION

1. Field of the Invention

This invention relates to a printing system, and more particularly, to a system in which accounting (cost assessment) is based on the specific functions used in the course of outputting a given body of text data or image data.

2. Related Background Art

In order to account for the usage of a copying machine a copy shop operator counts the number of pages to be copied and the number of copies of each page; and he makes his accounting based on these numbers. However, this accounting does not take into consideration any special functions that are carried out in connection with the copying. Recently, several special functions have been provided in automatic copying machines, such as automatic sorting, automatic stapling, double sided printing, etc. These special functions add value to the copied product; and therefore there is a need to account for their operation when calculating the usage of the copying machine.

SUMMARY OF THE INVENTION

It is an object of this invention to provide a printing system in which use of the above-mentioned specific functions can be accounted for appropriately.

According to one aspect of the present invention, there is provided a printing system which comprises means for performing a printing operation according to a requested mode; and means for performing an accounting operation according to the printing operation.

According to more specific aspects of the invention, the accounting operation is carried out based on one or more of the time or date of printing, the number of pages to be printed or copied, the size of the copy or document to be printed, the kind of paper to be printed on, and the name of the user.

According to a further aspect of the invention, there is provided a printing system which comprises means for printing documents, means for carrying out an accounting operation in regard to the operation of the printing means, means for printing based on a predetermined program, and means for storing the program in a manner such that it can be executed only upon receipt of a predetermined password.

According to yet another aspect of the invention, there is provided a novel printing system having a host computer and a printer which are connected with each other, and wherein the printer prints according to a plurality of operational modes. In this aspect the printing system comprises means for carrying out accounting operations based on the operational modes, means for executing a printing operation based on a command from the host computer, and means for displaying an amount of charge for the printing operation to the host.

According to additional specific features of the invention, there are provided means for prohibiting printing if the charge exceeds a predetermined amount or prohibiting printing until after the amount of charge has been transmitted to the host computer.

DETAILED DESCRIPTION OF THE PREFERRED EMBODIMENTS

The first embodiment of this invention will be described with reference to FIG. 1.

Figure 1:
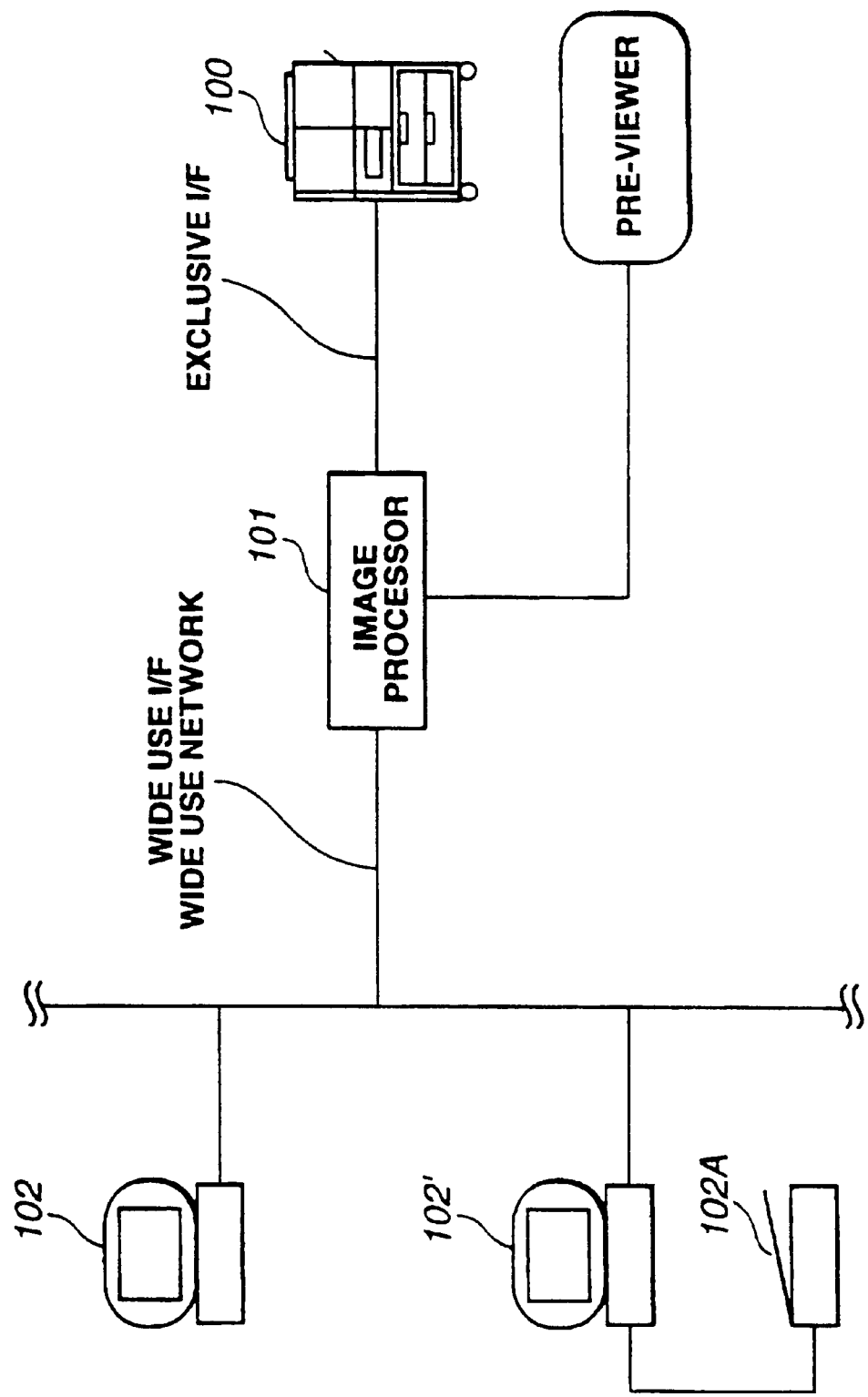
FIG. 1 is a block diagram showing one embodiment of a printing system according to the present invention.

The system of FIG. 1 comprises a digital copying machine 100, an image processor 101 and a plurality of host computers 102. The digital copying machine 100 is connected to the image processor 101 via an exclusive interface (I/F). The host computers, 102' are connected with the image processor apparatus 101 via a wide area interface or network such as Ethernet.

Image and text data (PDL) as well as commands from the host computers, 102' are transmitted to the digital copying machine 100 via the image processor 101.

In this embodiment, the digital copying machine 100 has several different copying functions such as a full color copying function, a mono-color copying function, a tri-color copying function, a twin-color copying function, etc., as well as several kinds of extension functions such as a printing function, a sorting function, a stapling function, a preview function, a color copy mode specifying function, and so on.

The full-color copying function is carried out by using the colors Y (Yellow), M (Magenta), C (Cyan) and K (Black). The mono-color copying function is carried out by using only K (Black). The tricolor copying function is carried out by using Y (Yellow), M (Magenta) and C (Cyan). The twin-color copying function is carried out by using the colors R (Red) and K (Black). The preview function is used for adjusting colors and for publishing by displaying the expected image on the screen of the host computer 102. The color copy mode specifying function is used to specify the printing mode, that is, if it is to be the full-color copy mode, the tri-color copy mode, the twin-color copy mode or the mono-color copy mode.

Figure 2:
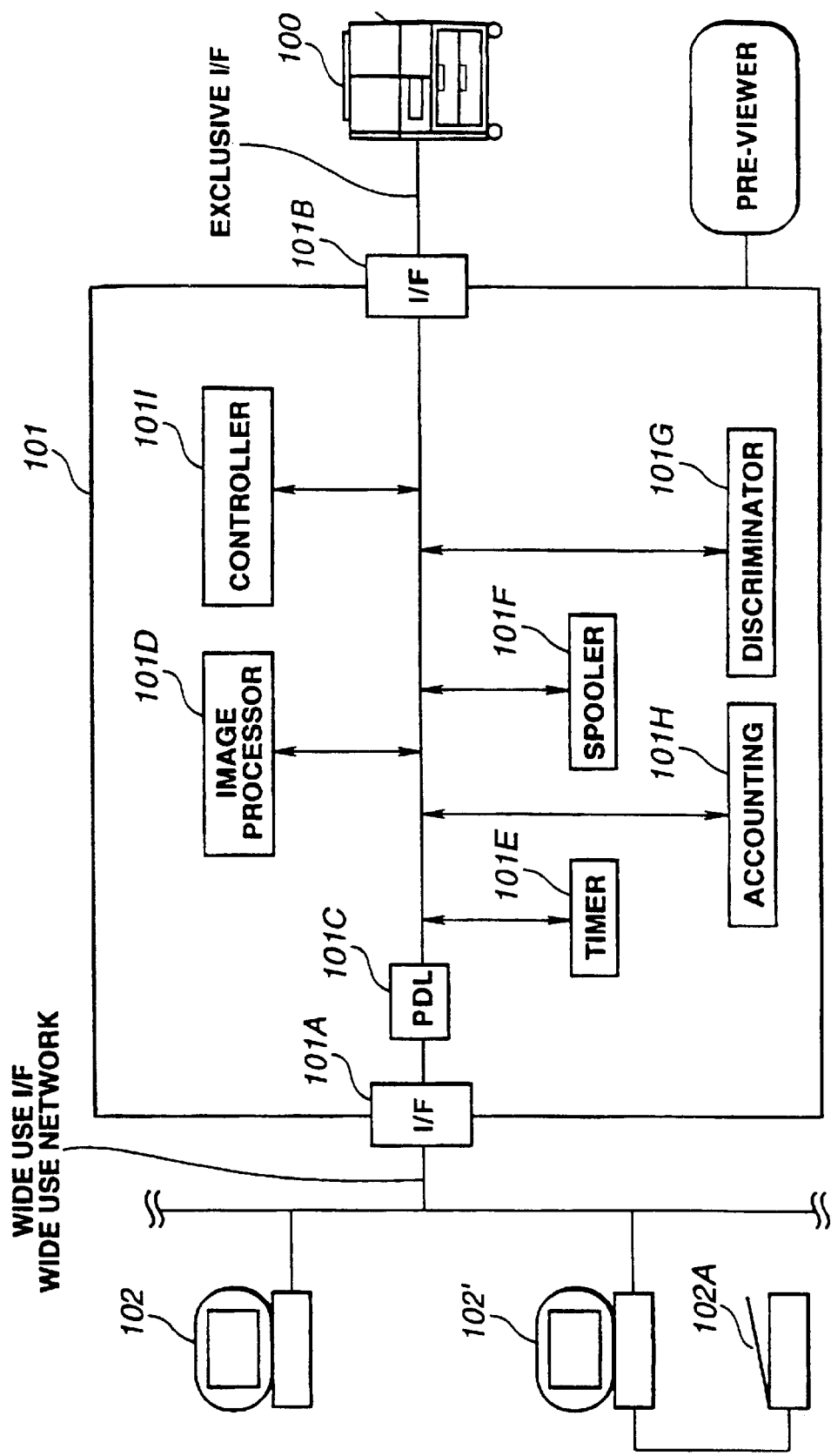
FIG. 2 is a block diagram of an image processor in the system of FIG. 1.

As shown in FIG. 2, the image processor 101 includes an interface 101A for transferring data to and from the host computers 102 via the wide area network. The image processor 101 also includes an exclusive interface 101B for transferring the data to and from the digital copying machine 100. There are also provided in the image processor 101, a PDL processor 101C for processing the PDL (image and text) data, an image processor 101D for carrying out several kinds of image processing such as gamma processing for the image data, a timer 101E, a circuit 101F for managing and logging each job, including a spooler, a discriminator 101G for checking the authenticity of each job order, an account processor 101H for processing the cost of the job based on an accounting program, and a controller 101I for controlling the accounting operations, the image processing operations, the communications and the changing of the accounting programs. The controller 101I controls the digital copying machine 100 so that it carries out a function specified by one of the host computers 102. The controller then logs the job and prepares an account based on the log. It then gives an account notice to each host computer according to a predetermined timing.

The account notice may be sent to the appropriate each host computer 102 along with each copying job, or periodically, such as monthly, or when the total charge exceeds a predetermined amount, or as requested by the user.

The accounting operation is carried out based on the following parameters: an acceptance time (this may be, for example, a week, a day or a holiday, daytime or nighttime, etc.), the number of pages to be copied, the kind of paper to be used in the copying operation, such as ordinary paper or OHP (Overhead Transparency Paper), etc., paper size, size of the file, name of the user (discountable or not), copy mode (full-color copy or mono-color copy, etc. in a case where the copying machine 100 is a color copying machine), necessity for logging after copying, user functions (these may be expansion functions or ordinary functions) and time. In this embodiment, these parameters may be set by the host computer 102.

In this embodiment, the image processor 101 normally executes the accounting operation when the copying operation is completed. The accounting operation for each parameter is executed according to a software program in the image processor 101. The specific program or the specific parameters may be changed upon inputting a password or by carrying out a special operation for that purpose.

The host computer prints the text data and image data which is picked-up by a digital camera (not shown) or by a scanner 102A. The data, which may include several kinds, may be delivered via a network, or reproduced by means of a player such as a CD-ROM player, etc., by using the digital copying machine 100 and the image processor 101.

Figure 3:
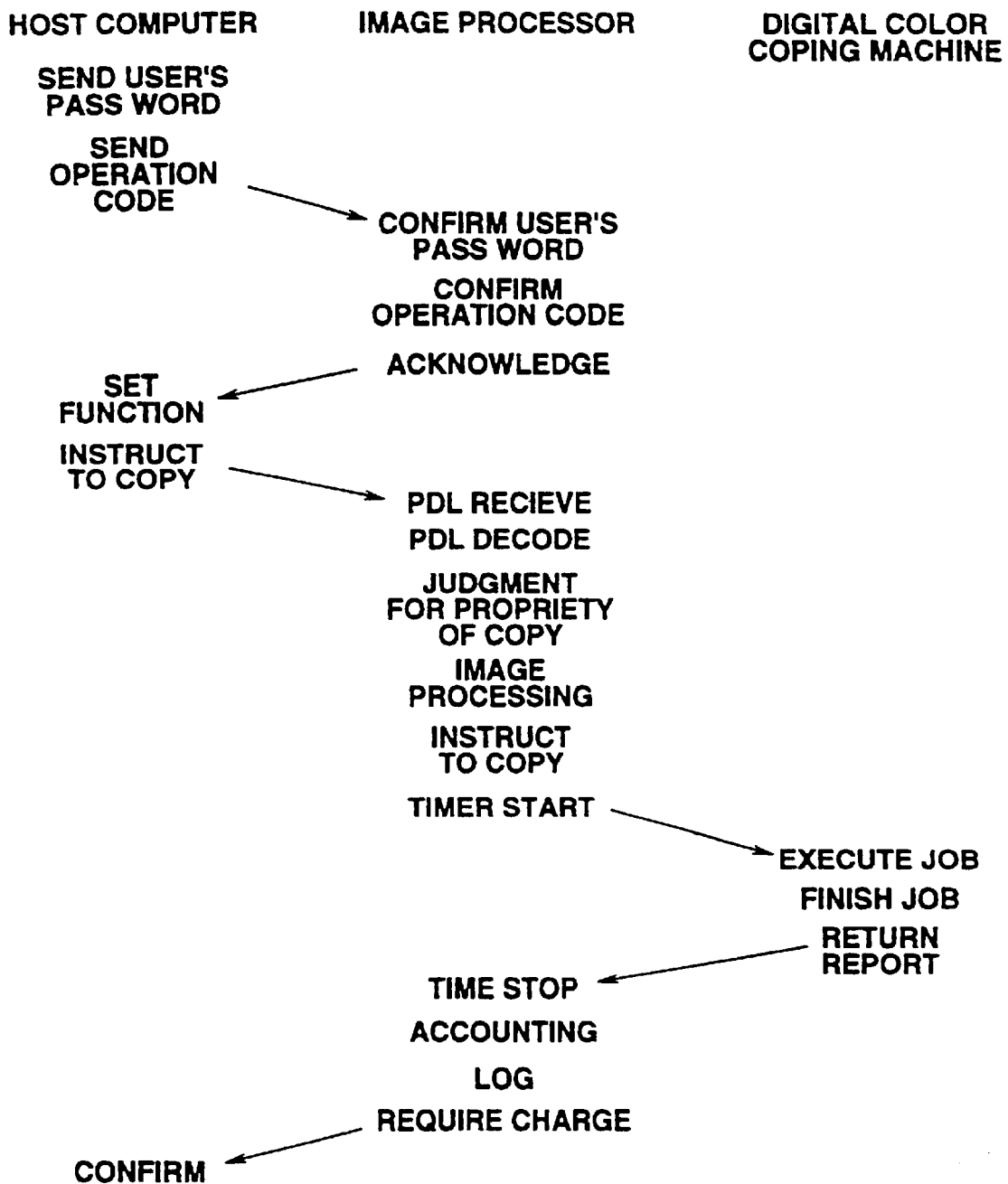
FIG. 3 is a flow chart for explaining the operation of the system of FIG. 1.

The basic operation of the system will now be described with reference to FIG. 3.

The host computer 102 transfers the user's password and operation code to the image processor 101. The image processor 101 confirms the password and an operation code, and decides if the user is authorized to operate the copying machine 100. The image processor 101 gives notice of the decision to the host computer 102; and the image processor 101 then confirms this information to the user. For example, the image processor 101 confirms whether the user is permitted to access the program, to change the program, etc.

After confirmation, the user specifies the image or document to be copied, sets the parameters and the copy mode, and then issues instructions to begin copying. The host computer 102 changes the image data or the text data to PDL data which includes the copy mode code, expansion function code, etc. The host computer 102 sends the PDL data and the user's ID (identification) code or machine's identification code to the image processor 101.

The image processor 101 stores the PDL data in a memory and records the PDL data in each user's assigned memory region according to each user's turn.

The discriminator 101G of the image processor 101 ascertains whether there is any prohibition regarding copying or printing of the PDL data. If the PDL data relates to a bill (i.e., money) or securities or involves copyrighted material, the copying of such data is prohibited. Accordingly, the discriminator 101G confirms that the PDL data is not such prohibited data. Then the image processor 101 carries out predetermined image processing.

In this embodiment, the discriminator 101G determines whether the data is copyable or not. This determination is made according to a control code which is sent with the PDL data from the host computer 102, and which represents several kinds of regulations regarding restrictions on copying, image processing etc. The discriminator 101G first reads the control code and then makes its decision based on the code. The various regulations corresponding to the control code are stored in a controlled access memory.

The discriminator 101G may include a function for checking specified images or like, copyright marking and the design of billing forms.

The image processor 101 instructs the digital copying machine 100 to carry out copying and expansion functions, and to begin operation of a clock in order to ascertain copying time.

At each job's turn, the digital copying machine 100 carries out the job (i.e., copying in a specified copy mode and carrying out expansion functions). Then the digital copying machine 100 reports to the image processor 101 that the copying job will be completed in the normal manner.

The image processor 101 clocks the copy time, and confirms whether the copying operation has been completed in the normal manner. Then, if this has been done, the image processor 101 carries out an accounting operation. The image processor 101 carries out this accounting operation based on the copy mode, the number of copies, the copy time, etc. The image processor 101 records the results of the accounting operation in a log and communicates the results to the appropriate host computer 102.

Figure 4:
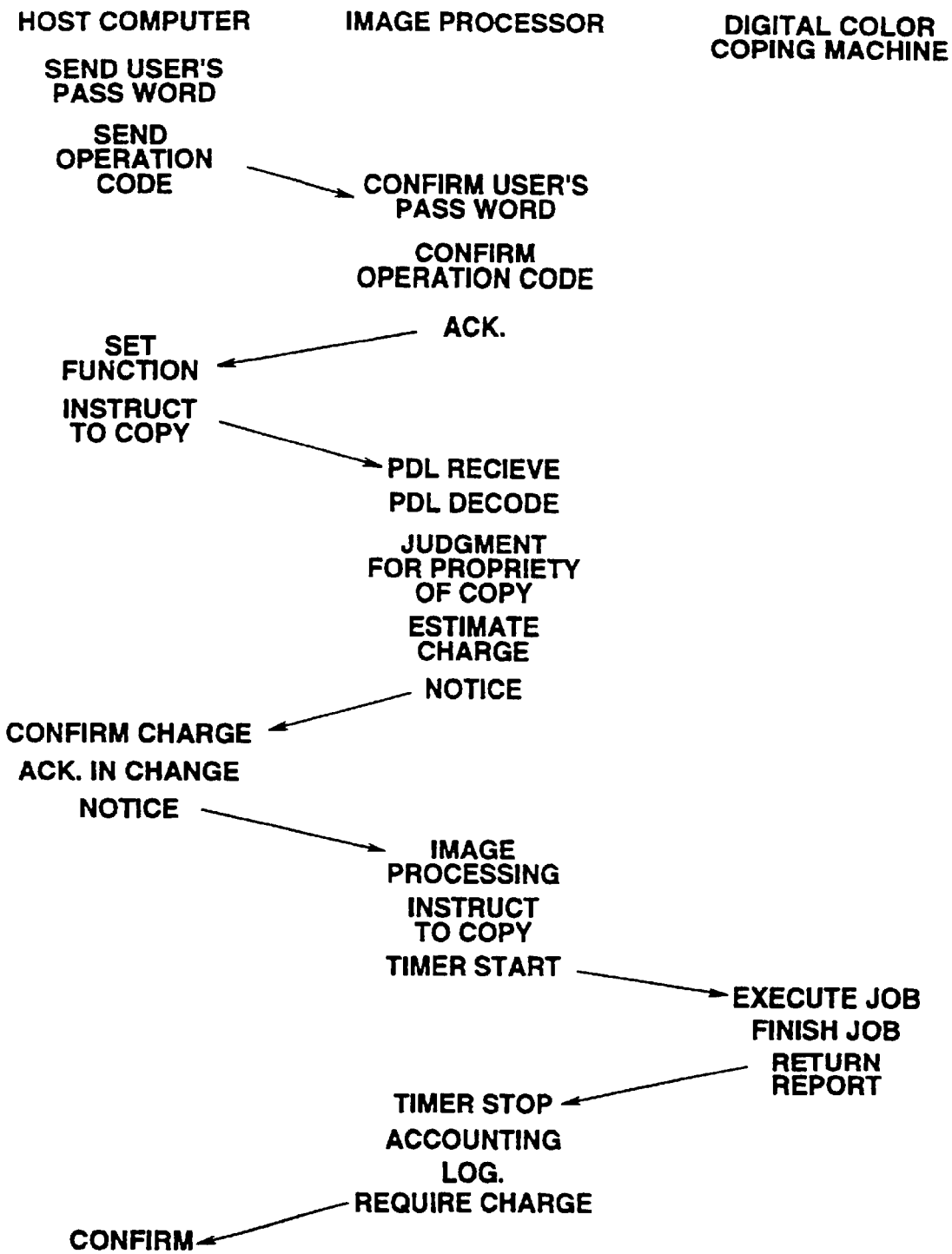
FIG. 4 is a flow chart for explaining the operation of a first modification of the system of FIG. 1.

Next, another operation will be described with reference to FIG. 4. In the above-described embodiment, the accounting operation is performed only by the image processor 101. However, in this next embodiment, the user can confirm the amount of the charge and can change the functions specified by the use, if needed.

As in the above described first embodiment, the user in this embodiment specifies the image or document to be copied, sets the parameters and the copy mode, and then instructs the system to begin the copying operation. The image processor 101 stores the PDL data into the user's assigned memory according to the user's turn.

The discriminator 101G of the image processor 101 ascertains whether there is any restriction as to the copying or printing of the PDL data. The image processor 101 also carries out to an accounting operation and calculates an estimated charge. Then the image processor 101 transmits the estimated charge to respective host computer 102.

The host computer 102 displays the estimated amount of charge to the user so that the user may change the specified functions.

The host computer 102 then gives notice of completion of the confirmation and the charge to the image processor 101. The image processor 101 carries out the image processing and sends the PDL data and a start copy instruction to the digital copying machine 100. The following operations of this embodiment are the same as for the previous embodiment. Thus, the image processor 101 carries out the accounting operation based on the job report, the represented number of pages, the copying mode, etc. According to this embodiment, a user can make copies while remaining within budget; and any possible problems regarding charges will be avoided beforehand.

Also, an upper limit of the amount to be charged may be preset, and the image processor 101 may give the notice of any excess when the charge amount exceeds this upper limit. This also helps to avoid problems in advance.

Figure 5:
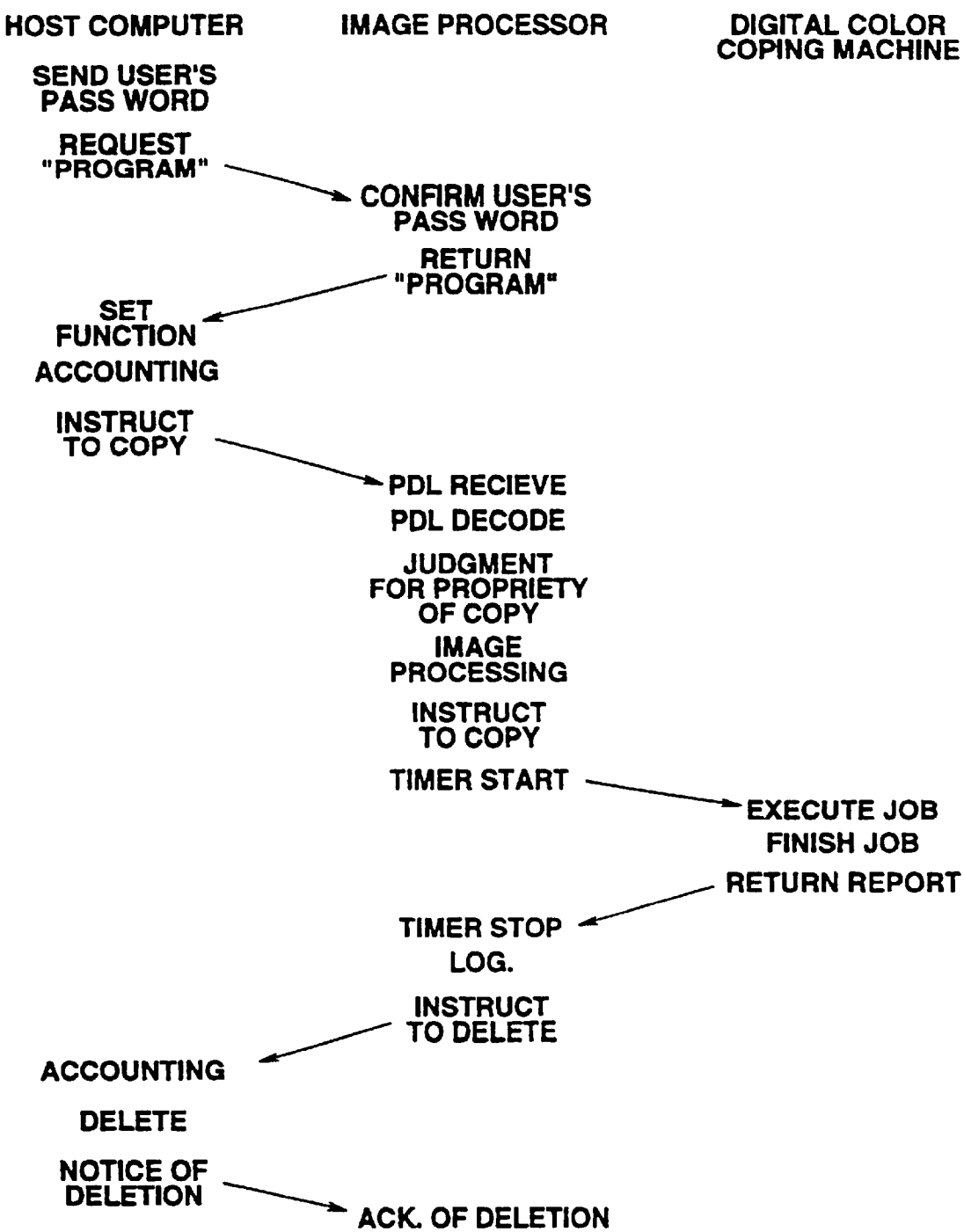
FIG. 5 is a flow chart for explaining the operation of a second modification of the system of FIG. 1.

Another operation will be described with reference to FIG. 5. In the above described embodiment, the accounting operation is carried out the image processor 101. In this embodiment however, the accounting operation is carried out by the host computer 102.

The host computer 102 specifies the functions and the document or documents to be copied, and requests the image processor 101 to send program software for an accounting operation.

The image processor 101 sends the program software to the host computer 102 after checking the user's code sent from the host computer 102. The host computer 102 then uses the program software to estimate the amount to be charged for the copying which is to be carried out according to the specified functions, and displays the amount so that it can be confirmed by the operator; and so that the operator can change the specified functions if desired.

After completion the final confirmation, the host computer 102 sends the PDL data to the image processor 101 and instructs it to start the copying operation as in the previous embodiment.

The operation of this embodiment in the same as that of the previously described embodiment. The image processor 101 transfers a job completion report, which has been sent from the digital copying machine 100, to the host computer 102. The image processor 101 then requests the host computer to delete the program software for the accounting operation. The host computer 102 carries out the accounting operation based on the job completion report, and deletes the program software.

Figure 6:
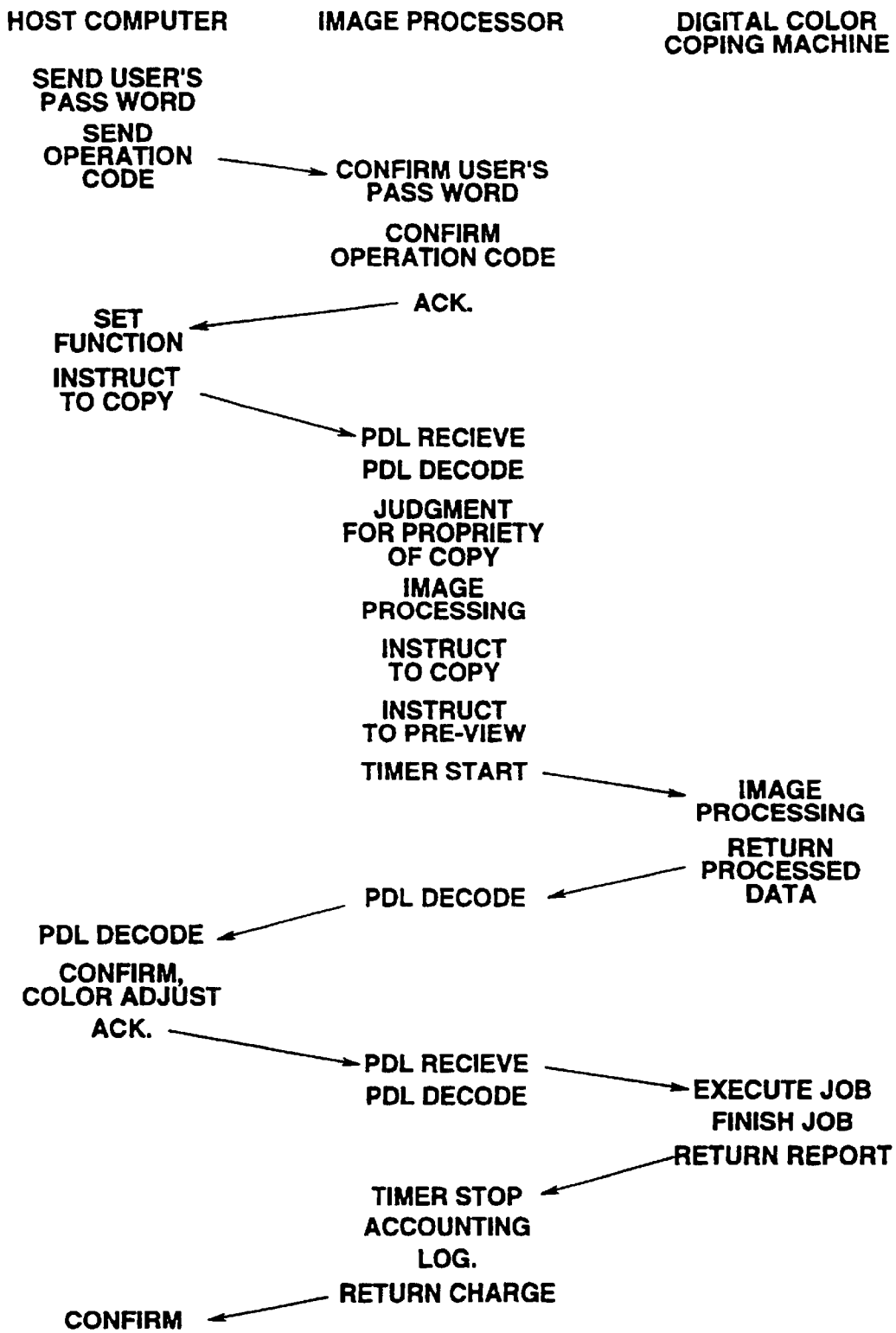
FIG. 6 is a flow chart for explaining the operation of a third modification of the system of FIG. 1.

Next, another operation, in which a preview operation is carried out, will be described with reference to FIG. 6.

The operation of this embodiment is basically the same as in the previously described embodiments. However, in this embodiment, before a copying operation is executed, the image data which is processed by the digital copying machine 100 is transferred to the host computer 102 via the image processor 101. The host computer 102 displays an image based on the image data which was sent from the digital copying machine 100 so that the user can confirm the image, adjust the color of the image, etc.

The user specifies the document, the image to be copied and the expansion functions by using the host computer 102. Then the user issues an instruction to start copying by operation of the host computer 102.

The details of this operation will now be described.

The host computer 102 transforms the image data to be copied into the PDL data. This data includes the copy mode code, an expansion function code and a command for preview. The host computer 102 transfers this PDL data to the image processor 101 via a network. In addition, the host computer 102 transfers the user's password and operation code to the image processor 101.

The image processor 101 stores the PDL data in a memory, and records the PDL data in each user's assigned region of the memory according to the user's turn.

The discriminator 101G of the image processor 101 discriminates whether copying or printing according to the PDL data is prohibited. Then the image processor 101 carries out the prescribed image processing.

The image processor 101 instructs the digital copying machine 100 to carry out copying and the expansion functions, and to begin clocking of the copying time.

The digital copying machine 100 does image processing which is different from the image processing carried out in the image processor 101; and it returns the processed image data to the image processor. The image processor 101 transforms the processed image data into the PDL data, and transfers the PDL data to the host computer 102.

The host computer 102 displays the processed image data so as to confirm the data and to permit the user to adjust the color and details of picture based on the processed image data. Then the host computer 102 transforms the image data into PDL data, and transfers the PDL data to the image processor 101.

The digital copying machine 100 carries out the requested jobs (i.e., copying in specified copy mode and carrying the requested expansion functions). Upon completion of the copying operation, the digital copying machine 100 transmits a report to the image processor 101 that the copying operation is completed is finished and that the copying mode is normal.

The image processor 101 stops clocking of the copy time, and confirms if the copying operation is completed and was performed normally. Then, if the copying operation was normal, the image processor 101 carries out the accounting operation. This accounting operation is based on the copy mode, the number of copies, the copy time, etc. The image processor 101 records the amount in a log and informs the host computer 102 of the amount.

According to the above embodiments, an accounting corresponding to particular parameters is obtained automatically. As a result, an operator can carry out an accounting operation in a simple manner and with little difficulty.

It is easy to change or modify the charge for copying and printing by changing the program software and associated parameters.

As mentioned above, it is possible with this embodiment to automatically request a charge according to a several kinds of service which may be specified by a user. Further, this embodiment can automatically request an charge according to copy mode and functions requested by a user.

What is claimed is:

1. A printing system comprising:
    a printing unit adapted to perform a printing operation according to a requested mode;
    an accounting unit adapted to perform an accounting operation according to the printing operation;
    a detector adapted to detect whether a charge exceeds a predetermined amount;
    a print prohibiting unit adapted to prohibit a printing operation if the charge exceeds the predetermined amount, as detected by said detector; and
    a controller adapted to change the printing operation to be performed, based on a result of the accounting operation.

2. A printing system according to claim 1, wherein the requested mode is a full-color printing mode.

3. A printing system according to claim 1, wherein the requested mode is a twin-color printing mode.

4. A printing system according to claim 1, wherein the requested mode is a mono-color printing mode.

5. A printing system according to claim 1, wherein the requested mode is a tri-color printing mode.

6. A printing system according to claim 1, wherein the requested mode is an area-specified printing mode.

7. A printing system according to claim 1, wherein the requested mode is a double-sided printing mode.

8. A printing system comprising:
    a printing unit;

a printer controller adapted to control said printing unit to carry out a predetermined printing process;

an account unit adapted to perform an accounting operation based on the predetermined printing process;

a detector adapted to detect whether a charge exceeds a predetermined amount;

a print prohibiting unit adapted to prohibit a printing operation if the charge exceeds the predetermined amount, as detected by said detector; and a process controller adapted to change the printing process to be performed by said printing unit, based on a result of the accounting operation.

9. A printing system according to claim 8, wherein the predetermined printing process is a stapling function.

10. A printing system according to claim 8, wherein the predetermined printing process is a sorting function.

11. A printing system comprising:

a printer;

a printer controller adapted to control said printer to perform a predetermined printing operation;

an accounting unit adapted to perform an accounting operation based on the predetermined printing operation;

a detector adapted to detect whether a charge exceeds a predetermined amount;

a print prohibiting unit adapted to prohibit a printing operation if the charge exceeds the predetermined amount, as detected by said detector; and a user input unit adapted to enable a user to change the predetermined printing operation to be performed based on a result of the accounting operation.

12. A printing system comprising:

a printer;

a counter adapted to count a number of pages to be printed;

an accounting unit adapted to perform an accounting operation based on the counted number of pages;

a detector adapted to detect whether a charge exceeds a predetermined amount;

a print prohibiting unit adapted to prohibit a printing operation if the charge exceeds the predetermined amount, as detected by said detector; and a print controller adapted to change the printing operation to be performed by said printer based on the accounting operation.

13. A copying system comprising:

a copying unit;

a counter adapted to count a number of pages to be copied;

an accounting unit adapted to perform an accounting operation based on the number of pages to be copied;

a detector adapted to detect whether a charge exceeds a predetermined amount;

a print prohibiting unit adapted to prohibit a printing operation if the charge exceeds the predetermined amount, as detected by said detector; and a controller adapted to change the printing operation to be performed by said copying unit based on a result of the accounting operation.

14. A copying system comprising:

a printing unit;

a first detector adapted to detect a size of a copy to be printed;

an accounting unit adapted to perform an accounting operation based on the detected size of the copy;

a second detector adapted to detect whether a charge exceeds a predetermined amount;

a print prohibiting unit adapted to prohibit a printing operation if the charge exceeds the predetermined amount, as detected by said second detector; and a controller adapted to change the printing operation to be performed by said printing unit based on a result of the accounting operation.

15. A printing system comprising:

a printing unit adapted to print on paper;

a first detector adapted to detect a kind of paper on which printing is to be performed;

an accounting unit adapted to perform an accounting operation based on the detected kind of paper;

a second detector adapted to detect whether a charge exceeds a predetermined amount;

a print prohibiting unit adapted to prohibit a printing operation if the charge exceeds the predetermined amount, as detected by said second detector; and a controller adapted to change the printing operation to be performed by said printing unit based on a result of the accounting operation.

16. A printing system comprising:

a printing unit adapted to print a document;

a first detector adapted to detect a size of the document;

an accounting unit adapted to perform an accounting operation based on the size of the document;

a second detector adapted to detect whether a charge exceeds a predetermined amount;

a print prohibiting unit adapted to prohibit a printing operation if the charge exceeds the predetermined amount, as detected by said second detector; and a controller adapted to change the printing operation to be performed by said printing unit based on a result of the accounting operation.

17. A printing system comprising:

a printing unit adapted to print a document;

a first detector adapted to detect a name of a user;

an accounting unit adapted to perform an accounting operation based on the name of the user;

a second detector adapted to detect whether a charge exceeds a predetermined amount;

a print prohibiting unit adapted to prohibit a printing operation if the charge exceeds the predetermined amount, as detected by said second detector; and a controller adapted to change the printing operation to be performed by said printing unit based on a result of the accounting operation.

18. A printing system comprising:

a printing unit adapted to print a document;

an accounting unit adapted to perform an accounting operation in regard to an operation of said printing unit based on a predetermined program;

a memory adapted to store the predetermined program in a manner such that the program is executed only upon receipt of a predetermined password;

a detector adapted to detect whether a charge exceeds a predetermined amount;

a print prohibiting unit adapted to prohibit a printing operation if the charge exceeds the predetermined amount, as detected by said detector; and a controller adapted to change the printing operation to be performed by said printing unit based on a result of the accounting operation.

19. A printing system that includes a host computer and a printer, which are connected with each other, wherein the printer prints according to a plurality of operational modes, said printing system comprising:

an accounting unit adapted to perform accounting operations based on the plurality of operational modes;

a printing unit adapted to perform a printing operation based on a command from the host computer;

a detector unit adapted to detect whether a charge exceeds a predetermined amount;

a print prohibiting unit adapted to prohibit a printing operation if the charge exceeds the predetermined amount, as detected by said detector unit; and a controller adapted to change the printing operation to be performed based on a displayed amount of charge determined by said accounting unit.

20. A printing system according to claim 19, wherein the plurality of operational modes includes several different printing modes.

21. A printing system according to claim 19, wherein the plurality of operational modes includes several different expansion function modes.

22. A printing system comprising:

a printing unit adapted to print based on a predetermined printing mode;

an accounting unit adapted to perform an accounting operation based on the predetermined printing mode and to calculate a charge for printing based on the predetermined printing mode;

a detector unit adapted to detect whether the charge exceeds a predetermined amount;

a print prohibitor adapted to prohibit printing if the charge exceeds the predetermined amount, as detected by said detector unit; and a controller adapted to change the predetermined printing mode to be executed based on a result of an accounting operation.

23. A printing system that includes a host computer and a printer, which are connected with each other, the printer being capable of executing several different operational modes, said system comprising:

an accounting unit adapted to perform an accounting operation based on an operational mode and to calculate an amount of charge based on the accounting operation;

a detector adapted to detect whether the charge exceeds a predetermined amount;

a print prohibiting unit adapted to prohibit a printing operation if the charge exceeds the predetermined amount, as detected by said detector; and a controller adapted to change the operational mode to be executed based on the amount of charge.

24. A printing system that includes a host computer and a printer, which are connected with each other, the printer being capable of executing several kinds of operational modes, said system comprising:

an accounting unit adapted to perform an accounting operation and to calculate an amount of charge based on an operational mode requested by the host computer;

a transmitter adapted to transmit the amount of charge to the host computer;

a detector adapted to detect whether the charge exceeds a predetermined amount;

a print prohibiting unit adapted to prohibit a printing operation if the charge exceeds the predetermined amount, as detected by said detector; and a controller adapted to change the operational mode to be executed, wherein the printer does not execute the operational mode until after the amount of charge has been transmitted to the host computer, such that, in response to the amount of charge, a user can modify the operational mode to be executed.

25. A printing method comprising:

a step of performing a printing operation according to a requested mode;

a step of performing an accounting operation according to the printing operation;

a step of detecting whether a charge exceeds a predetermined amount;

a print-prohibiting step, in which is prohibited a printing operation if the charge exceeds the predetermined amount, as detected in said detecting step; and a step of changing the printing operation to be performed, in accordance with input from a user, based on a result of the accounting operation.

26. A computer-readable storage medium storing a program for implementing a printing method, the program comprising:

program code for an accounting step of performing an accounting operation according to a printing operation;

program code for an output step of outputting a result of the accounting operation before performing the printing operation;

program code for a detecting step of detecting whether a charge exceeds a predetermined amount;

program code for a a print-prohibiting step in which is prohibited a printing operation if the charge exceeds the predetermined amount, as detected in said detecting step; and program code of a change step of changing the printing operation to be performed, in accordance with input from a user, based on the result of the accounting operation.

* * * * *

UNITED STATES PATENT AND TRADEMARK OFFICE
CERTIFICATE OF CORRECTION

PATENT NO. : 6,385,675 B1
DATED : May 7, 2002
INVENTOR(S) : Fumiyoshi Yamaguchi

It is certified that error appears in the above-identified patent and that said Letters Patent is hereby corrected as shown below:

<u>Title page,</u>
Item [57], ABSTRACT,
Line 10, "charge" should read -- charges --.

<u>Column 2,</u>
Line 38, "tricolor" should read -- tri-color --.

<u>Column 4,</u>
Line 9, "like," should read -- the like, --.

<u>Column 5,</u>
Line 3, "out" should read -- out by --; and
Line 18, "completion" should read -- completion of --.

<u>Column 6,</u>
Line 37, "an" should read -- a --.

Signed and Sealed this

Twenty-fifth Day of May, 2004

JON W. DUDAS
*Acting Director of the United States Patent and Trademark Office*